June 7, 1966     E. C. WOOD     3,254,649

SKIN CLIP REMOVER

Filed May 20, 1963

INVENTOR.
Ernest C. Wood
BY
Ooms, McDougall and Hersh
Att'ys

United States Patent Office 3,254,649
Patented June 7, 1966

3,254,649
SKIN CLIP REMOVER
Ernest C. Wood, Los Angeles, Calif., assignor of fifty percent to R. G. Le Vaux
Filed May 20, 1963, Ser. No. 281,557
1 Claim. (Cl. 128—321)

This invention relates in general to a device used for the removal of surgical and skin clips and relates more particularly to an economical clip remover which is adapted firmly to grip and to maintain a firm gripping relationship on the clip during its removal. This invention will hereinafter be described with reference to the device, as used for the removal of skin clips but it will be understood that the concepts of this invention will have application also to the removal of surgical clips.

The use of skin clips for closing the edges of incisions or wounds offers a number of advantages which are set forth in greater detail in the application hereinafter referred to. Clips for which the device of the present invention is adapted to be used are illustrated in the United States Patent No. 3,098,232, issued July 23, 1963, entitled "Means and Method for Suturing Wounds and Elements for Use in Same." The clips are generally U-shaped with barbs projecting inwardly from the legs. In use, the legs are pressed in a direction towards each other so that the barbs pierce the skin adjacent the edges of the incision for the purpose of bringing the skin together to close the incision and for holding the skin together until the wound has been healed. In order to remove the clips, the legs of the clips are adapted to be spread to remove the barbs from the skin and to release the clip for disposal. This can be achieved by a clip remover, however, since the wound may be swollen, the tips of the removing device may find difficulty for insertion between the legs of the clip whereby, when force is exerted against the sides of the legs, the removing device may slip.

The present invention is addressed to a device that avoids the aforementioned difficulties in a very simple and unique manner. This is accomplished in the clip remover of this invention by the construction of the tips with grooves with each groove being formed to pass through the space between the clip legs adjacent the back-wall of the clip to permit easy insertion of the remover and positive engagement between the grooves and the legs of the clip. When the tips of the remover are displaced in the direction away from each other, the legs of the clip are spread while, at the same time, the walls defining of the grooves prevent the clip from slipping and from becoming disengaged from the remover.

It is therefore one object of this invention to provide a simple and economical clip remover.

It is another object of this invention to provide a skin clip remover which is adapted to be easily and quickly inserted between the legs of a skin clip.

It is still another object of this invention to provide a skin clip remover which is adapted to spread the legs of a clip for removing the same from the skin with minimum danger of becoming disengaged therefrom.

Other objects and features of this invention will become apparent upon examination of the following specification and claim, together with the drawings, wherein:

Figure 1:
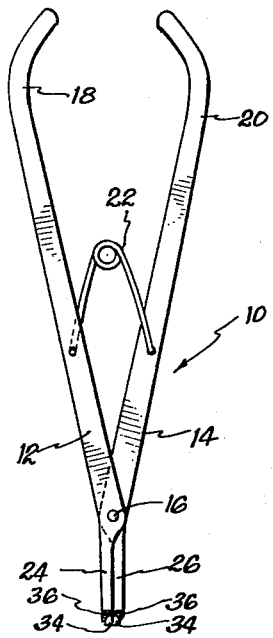
FIG. 1 is a plan view of the skin clip remover adapted to be moved up from the plane of the paper for engagement with a skin clip.
Figure 2:
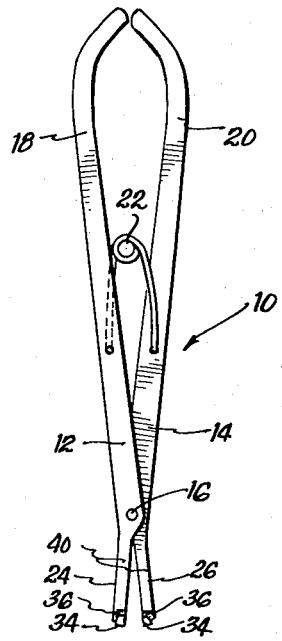
FIG. 2 illustrates the skin clip remover with its tips in open position.
Figure 3:
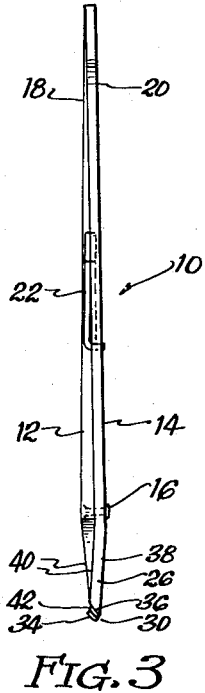
FIG. 3 is a side view of the skin clip remover.

Referring now to the drawings a skin clip remover is illustrated generally by the reference character 10. It comprises a pair of elongate legs 12 and 14 pivotally joined intermediate their ends by means of a pin 16 for displacement of the tips 24 and 26 in the direction towards each other responsive to actuation of the handle portions 18 and 20 towards each other, and vice versa. The legs 12 and 14 have inwardly curved aligned elongate handle portions 18 and 20 at one end which are biased apart by a helical spring 22 whose ends are connected to the legs 12 and 14. The opposite end or tips 24 and 26 of the legs 12 and 14 are also aligned as seen in FIG. 3 and are normally brought into proximity with each other by the biasing of spring 22 as seen in FIG. 1.

Each tip 24 and 26 is provided with a groove 30 extending inwardly along from their outer edges 32 to form a forward wall portion 34 and a rearward wall portion 36 at each tip 24 and 26. The grooves 30 are formed along an axis somewhat oblique to the long axis of the legs 12 and 14 and extend from the lower end adjacent the back wall 38 to a position at the front wall 40. In addition wall portion 34 is cut away to present a somewhat narrower forward bevelled face 41 than the rearward wall portion 36 to which it is joined by the perpendicuar wall portion 42. The rearward wall portion 36 on the other hand is cut away adjacent its lower end as seen in FIGS. 4 and 5 and is provided with a bevel parallel to face 41 by virtue of the angle of groove 30.

Figure 4:
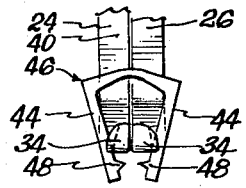
FIG. 4 is an enlarged view of the clip remover tips engaged with a skin clip.
Figure 7:
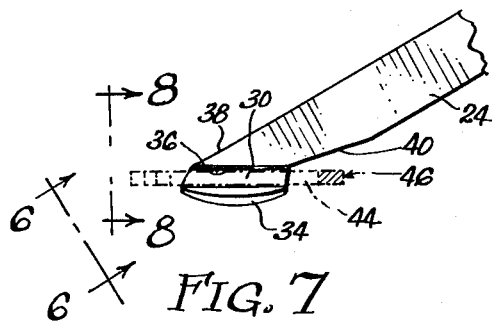
FIG. 7 is an enlarged side view of the tip portion of the clip remover engaged with a clip.
Figure 8:
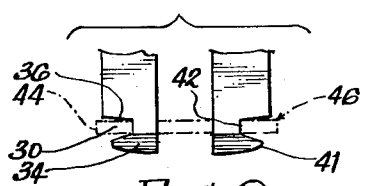
FIG. 8 is a sectional view taken through the line 8—8 in FIG. 7 and looking in the direction of the arrows.

The small face 41 of portions 34 permits easy insertion between the legs 44 of a skin clip 46 seen in FIG. 4 in its incision closing condition. It will be noted that the space between the legs 44 adjacent the back leg of the clip 46 permits the insertion of portions 34 between the clip legs and alignment of grooves 30 with the respective legs 44. Thus each portion 34 is approximately less than one half the distance between the legs 44 adjacent the back leg 46. As seen in FIG. 7 the grooves 30 are engaged parallel with the legs 44 so that the handle portions 18 and 22 project upwardly at an oblique angle to permit efficient use and complete maneuverability. Movement of the tips 24 and 26 toward the barbs 48 of the clips firmly engages the legs 44 against the walls 42 while the legs 44 are adapted to rest firmly against the wide face of the rearward portion 36.

Figure 5:
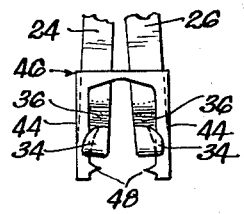
FIG. 5 is an enlarged view of the clip remover tips opening a skin clip.
Figure 6:
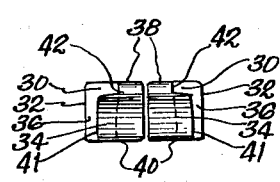
FIG. 6 is a sectional view taken through the line 6—6 in FIG. 7 and looking in the direction of the arrows.

When the handle portions 18 and 20 are displaced towards each other, the walls 42 exert pressure against legs 44 to spread the legs as illustrated in FIGS. 5 and 7. The barbs 48 are therefore withdrawn from the skin. With the legs 44 held between the portions 34 and 36 a tendency of the clip to swivel or disengage from the remover 10 is resisted and the clip may be easily disengaged and discarded.

The foregoing is a description of one embodiment of a skin clip remover the inventive concepts of which are set forth in the accompanying claim.

I claim:

An instrument for use with skin clips of flat sheet stock having a crosswise bail, a pair of laterally spaced apart arms extending forwardly substantially perpendicularly from the end portions of the bail and barbs extending inwardly from the inner lateral edges of the free ends of the arms and, in which in position of use, the ends of the arms are displaced in the direction towards each other towards closed position to engage the barbs into the surface of the skin, said instrument comprising a pair of elongated members pivotally interconnected intermediate their ends to provide handle portions at one end of the pivot and leg portions on the other end of the pivot, a tip on the end of each leg, a groove extending inwardly from the lateral outer edges of each tip for a distance less than the width of the tip and throughout the length of the tip, said grooves being horizontally disposed when the handle members are positioned at a shallow oblique angle to the horizontal, said tips being dimensioned to have a combined width less than the spaced relationship between the arms at the bail portion of the clip whereby the crosswise aligned tips can be displaced between the arms of the closed clip with the outwardly facing grooves in crosswise alignment with the inner lateral edges of the arms while the clip is horizontally disposed in position of use whereby during displacement of the legs in the direction away from each other towards open position the inner lateral edges of the clip arms are received in said grooves and then spread in the direction away from each other to effect withdrawal of the barbs from the skin while the arms of the skin clip remain within the grooved portions for retention of the removed clip by the instrument.

References Cited by the Examiner

UNITED STATES PATENTS

| | | | |
|---|---|---|---|
| 465,606 | 12/1891 | Bartlett | 81—6 |
| 1,178,404 | 4/1916 | Lloyd | 29—223 |
| 1,989,918 | 2/1935 | Drypolcher | 254—28 |
| 1,995,165 | 3/1935 | Anderson | 29—223 |
| 2,428,503 | 10/1947 | Ruskin | 254—28 |
| 2,607,247 | 8/1952 | Wegs | 81—3.6 |
| 2,678,189 | 5/1954 | Shelton | 254—28 |
| 2,897,701 | 8/1959 | Strnisha | 81—5.1 |

FOREIGN PATENTS 525,160   5/1921   France.

WILLIAM FELDMAN, *Primary Examiner*.

MILTON S. MEHR, M. HENSON WOOD, JR.
*Examiners.*